May 22, 1945.  W. R. HARDING ET AL  2,376,770
SERIES VARIABLE SPEED DRIVES
Filed Nov. 11, 1941  2 Sheets-Sheet 1
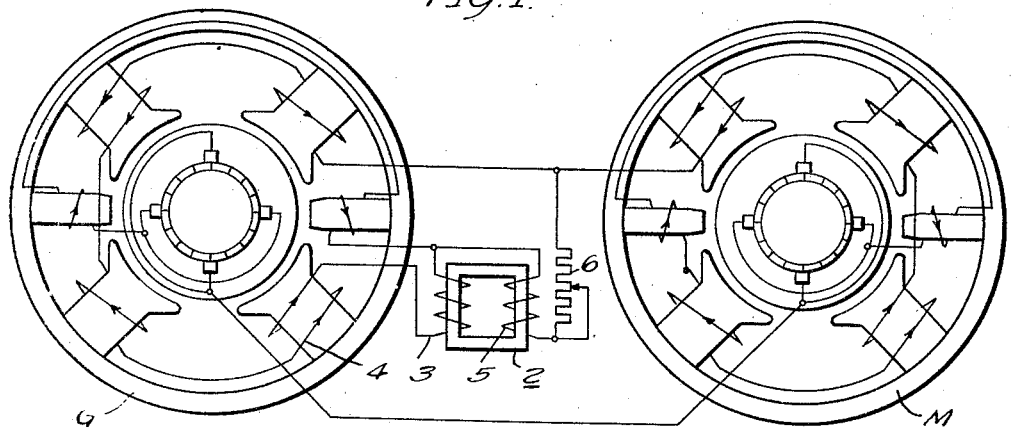
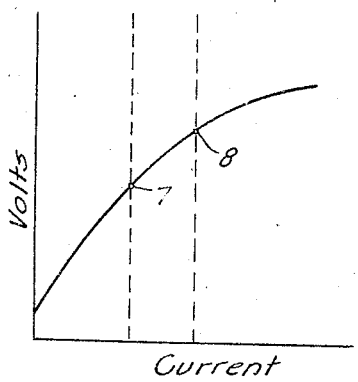
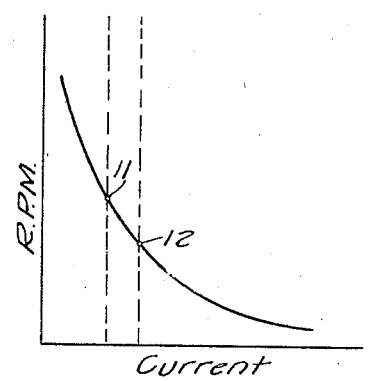
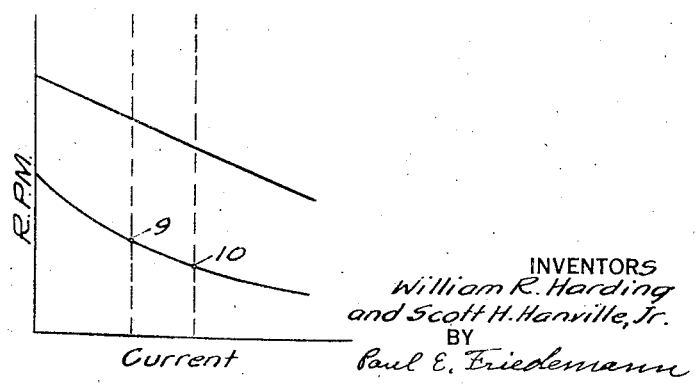
INVENTORS
William R. Harding
and Scott H. Hanville, Jr.
BY Paul E. Friedemann
ATTORNEY May 22, 1945.   W. R. HARDING ET AL   2,376,770
SERIES VARIABLE SPEED DRIVES
Filed Nov. 11, 1941   2 Sheets-Sheet 2
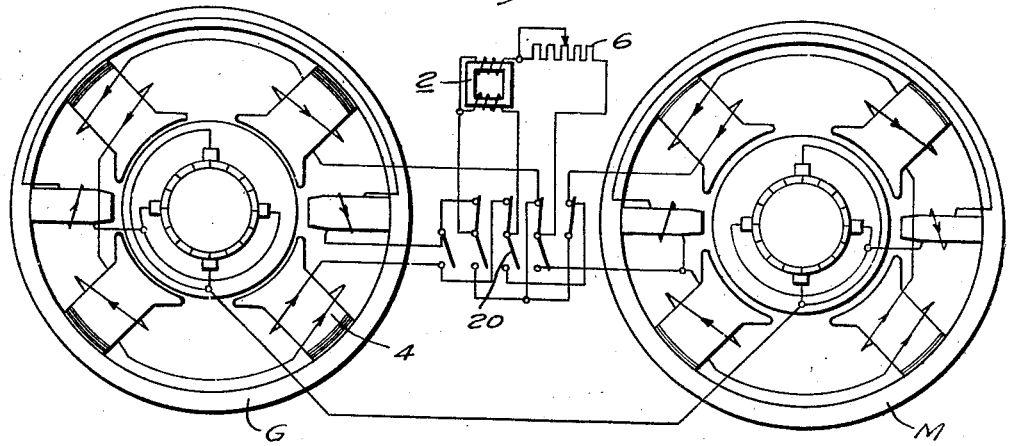
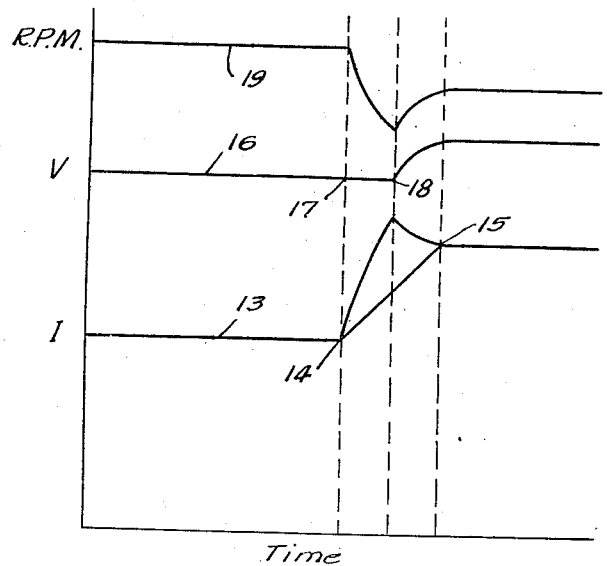
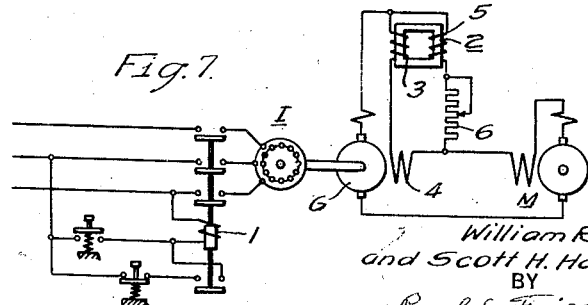
WITNESSES:
INVENTORS
William R. Harding
and Scott H. Hanville, Jr.
BY
Paul E. Friedemann
ATTORNEY Patented May 22, 1945

2,376,770

UNITED STATES PATENT OFFICE 2,376,770

SERIES VARIABLE SPEED DRIVE

William R. Harding, Murrysville, Pa., and Scott H. Hanville, Jr., Huron, Ohio, assignors to Westinghouse Electric & Manufacturing Company, East Pittsburgh, Pa., a corporation of Pennsylvania Application November 11, 1941, Serial No. 418,630

4 Claims. (Cl. 172—239)

Our invention relates to adjustable speed drives, and more particularly to a variable voltage generator and motor drive in which the generator is a series generator without a separately or shunt excited field winding, and the motor is also of the series type having substantially the same frame size, though not necessarily so, as the generator, and thus having a rating substantially equal to that of the generator.

Our present invention includes improvements over our invention disclosed and claimed in our pending application entitled "Series speed control units," filed on October 19, 1940, Serial No. 361,934 now matured into Patent 2,303,457.

Series motors, of course, are in regular use and well known to the trade, but series generators for operating motors have always been held very unsatisfactory. For instance, as one of their disadvantages, such generators have a rising voltage characteristic with an increase in load current. This is usually very unsatisfactory. However, by selecting the proper values of the constants of both the generator and the motor, the motor speed may be kept substantially constant for any speed setting selected regardless of the variations in load.

One broad object of our invention is to provide for substantially constant speed of a series motor energized from a series generator for all speeds selected for the motor regardless of the variations in load on the motor and independent of the rate of the variations of such load on the motor.

Another object of our invention is to provide for stable high torque operation of a series motor, operated from a series generator, at low motor speed and rapid load variation.

Another object of our invention as hereinafter disclosed is to provide for good speed regulation with rapidly varying loads, and also stable operation at light loads on motor.

It is also an object of our invention to provide during rapid changes of load good speed regulation in a variable voltage drive utilizing a series generator and a series motor, a low residual flux in the generator and a low residual flux in the motor but wherein the residual flux of the motor is less than the residual flux of the generator.

A still further object of our invention is the provision of the substantially constant speed for a series motor energized from a series generator for all speeds selected for the motor regardless of the variations in load and the rate of variations in load on the motor coupled with the provision for increasing the torque of the motor, particularly at the low speeds and coupled with the provision of low residual flux in the generator and still lower residual flux in the motor.

Another broad object of our invention is to provide for stable high torque operation of a series motor operated from a series generator at low speeds and to provide for good speed regulation of the motor at low rapidly variable loads and low speeds.

It is a still further object of our invention to provide for good speed regulation at low speeds from low loads to high loads regardless of the rate of variation of the loads.

It is also an object of our invention to provide in a variable voltage drive having a series generator and a series motor a residual flux in the motor less than the residual flux of the generator, and means to obtain high torque at low speeds up to the stalled rotor condition of the motor and good speed regulation at low speeds and rapidly varying low loads.

Another object of our invention is to provide simple and effective means for decreasing the effect of armature reaction tending to displace the current in combination with the provision of good speed regulation at low speeds and light rapidly varying loads while utilizing a low residual flux in a series generator and a still lower residual flux in the motor.

The objects hereinbefore expressed are believed to be merely illustrative, and many other objects and advantages will become apparent from a study of the following specification when considered with the drawings accompanying this specification and in which drawings, Figure 1 is a diagrammatic showing of our invention;

Figs. 2, 3, 4, and 5 show a plurality of curves helpful in illustrating some of the characteristics of our series drive;

Fig. 6 is a diagrammatic showing of the modification showing a more comprehensive combination; and Fig. 7 shows our drive in its simplest diagrammatic form.

In Fig. 1, G designates a series generator and M a series motor. The two dynamo-electric machines G and M are preferably, though not necessarily, of the same frame size and thus have comparable ratings and are otherwise preferably generally alike in structure.

As will be seen from Fig. 7, the generator is driven by suitable constant speed alternating current motor I representing an induction motor connected through a suitable line switch I, controlled by means of push-button control to a suitable source of alternating current. The generator G, of course, may be driven at some selected constant speed in any suitable manner, and it is not one of the features of our invention that a constant speed induction motor need be used.

In the showing in Figs. 1 and 6, we have shown the motor and the generator of the four-pole type, but it is readily apparent that our invention is not limited to a four-pole construction but may be applicable to machines of the two-pole type or of the type having more than four poles.

To improve the speed regulation, particularly at light loads, and rapidly varying loads, and also at low speeds and light loads and rapidly varying loads and heavy loads which may also vary rapidly, our theoretical considerations showed us that this could be accomplished by including our present contribution to the art.

Theoretical considerations also showed that better speed regulation at high loads and low speeds could be obtained if the current sheet were prevented from shifting because of armature reaction, and still better regulation could be obtained if a control were provided wherein the voltage characteristic of the generator is not susceptible to rapid variations in load that is a control which would tend to maintain the generator voltage when the current demand of the motor was increasing and in which the speed characteristic of the motor is not susceptible to rapid variations in load, or both. By the term current sheet is meant the effective region on the surface of the brushes of a machine at which it may be considered that the entire current flow is concentrated.

In Fig. 1, we show interpoles or commutating poles on the generator having a high magnetic capacity so that the pole pieces for the interpoles do not become readily saturated. Since the generator for the past operation is selected to have a low residual, the burden of maintaining its voltage at low motor speeds and heavy loads falls more and more on the generator series field windings. Since the voltage is necessarily low at the low speeds, the armature reaction distorts or shifts the current sheet so much that the generator cannot maintain its voltage. The result is poor regulation at low motor torques, at high loads and low speeds. We provide in our present combination the additional improvement of using interpoles for the generator having a high magnetic capacity. At low speeds and heavy loads, the interpoles do not saturate and the current sheet thus remains fixed. In our present case, we provide still further improvements to the operating characteristics of the system by preventing rapid variations in load to disadvantageously affect the operation of the system. In Figs. 1 and 7, we show a reactor 2 having a closed magnetic circuit and having one of its coils, as coil 3, connected in series with a generator field 4 and having its other coil, as 5, connected in series with the adjustable rheostat 6 for controlling the voltage of generator G. This reactor is in effect a transformer and is selected to have a ratio so that the most correction is provided at the point most needed. For example, at low motor speeds and high torques it is desirable that the generator voltage be as high as possible to avoid a dropping off in motor speed. If for the particular operating conditions it is desired to have the speed maintained at this point, a transformer of a suitable ratio to provide the most correction for this operating condition would be selected. When there is a rapid variation in load on the motor, the current flowing in the loop circuit, including the generator and the motor armature windings, the series field windings of the two machines, the rheostat and the reactor coils, changes rapidly. This loop circuit is essentially a very simple Ward-Leonard system, and in which system the rheostat 6 is used to effect the speed control for the motor. In this novel type of series Ward-Leonard system, if no reactor is used, the current in the loop circuit will, during the change, take the path of least resistance, and since the series field winding 4 is an inductive circuit, the load current will flow through the rheostat 6 rather than through the field 4. For instance, if the load on the motor is rapidly increased, the excitation of the motor is increased, therefore tending to decrease its speed, and in the absence of the reactor 2, the current flowing through the rheostat rather than the field 4, the voltage of the generator remains substantially constant, with the result that there is a rapid decrease in the motor speed. True, this may only be temporary but for some applications, it is a very unsatisfactory operation. For instance, if the load increases, the generator for the moment will be operating at 7 of its saturation curve, see Fig. 2, and after the increase of the load will be operating at 8. At the same time, the load current on the motor varies from 9, Fig. 4, to 10 which means that the speed of the motor, referring to Fig. 3, will drop, on the basis of constant voltage, from 11 to 12. If these changes are all referred to time, as is indicated by the curves in Fig. 5, the load current variations will be indicated by the curve 13, and during a rapid change in load current will move, substantially as indicated, from 14 to 15 in a given time. This shows that a rather abrupt increase in current occurs which reaches a peak value at the time limit of the centermost dotted line and then drops off slightly. The generator voltage represented by curve 16 will at the instant the load begins to increase still for sometime, measured by the difference in position of points 17 and 18, maintain its voltage. The speed variation of the motor, as represented by curve 19, will vary as indicated. With the reactor in the loop circuit any change, as for instance, an increase in the load on the motor, will require an immediate increase in the current through the field winding 4. The generator thus immediately attains a new desired higher voltage, and whatever effect may have been produced on the field of the winding of the motor is counteracted by the increase in voltage of the generator.

Our reactor is, of course, of particular utility when the motor is operating at low speed where any abrupt variations in load might well reduce the generator voltage to a value so low as to stop the motor.

Our reactor thus provides an improved operation for our entire system utilizing low residual machines and utilizing machines wherein the generator has a higher low residual than the low residual of the motor. By low residual is meant a residual that is low with reference to the no-load saturation flux of the machine, namely, lower than is normal for dynamoelectric machines of conventional characteristics.

Our special arrangement of the reactor has, of course, utility for the motor field as well as for the generator field. In Fig. 6, we show a system arranged where the same reactor may be used both for the generator and for the motor. For instance, with the switch 20 disposed in the position shown, the reactor is used in conjunction with the generator field 4 and may be retained in that position until the very maximum speed of the motor has been obtained by means of the control of the field of the generator by rheostat 6. However, when all of the resistor sections of rheostat 6 have been inserted, and still higher speeds are to be obtained from the motor M, switch 20 is thrown to its other position, thereby leaving the generator field winding for maximum excitation and for the moment the motor field for maximum excitation. The rheostat 6 may then be adjusted to get still higher speeds from the motor, but regardless of the position of switch 6, the advantageous function of the reactor 2 is always obtained. For the first stage, it is obtained by providing voltage changes with load, and for the second stage, the reactor prevents rapid field current changes and thus changes in speed of the motor with rapid changes in load. This will be better understood when it is seen that in its second position the switch 20 connects the coil 3 of the reactor between the generator series field 4 and the motor series field M. The other reactor coil 5 with the rheostat 6 in series therewith is connected in parallel with the reactor coil 4 and the motor series field M. Inductive circuits are thus provided in both paralleled branches and due to the characteristics of inductive circuits any changes in motor field currents are opposed. With the arrangement we have thus shown in this application, good speed regulation is obtained over a wide range of loads for any selected speed regardless of the rate of change of the load.

The reactor makes possible speed control in a series drive by decreasing the motor series field excitation. A method of speed control not heretofore possible is thus obtained. The speed range of the equipment has thus been widened without any increase in the physical size of the machines particularly for those loads demanding constant horsepower operation.

The reactor also improves, that is, stabilizes the operation for steady light load conditions.

We are aware that others, particularly after having had the benefit of our teachings, may devise still further circuits and other similar arrangements to obtain the novel results. We, therefore, do not wish to be limited to the specific showing made but wish to be limited only by the scope of the claims hereto appended.

We claim as our invention:

1. In a series drive, in combination, a series generator having an armature winding, a series field winding, a series motor, of the same general design and capacity as the generator, connected in a loop circuit to the series generator to be electrically driven thereby; an adjustable resistor shunting the generator series field winding for controlling the excitation of the generator series field winding; a reactor having two coils one connected in series circuit relation with the series field winding and the other in series circuit with the adjustable resistor, said two series circuits being connected in parallel; and means for driving the series generator at substantially constant speed.

2. In a series drive, in combination, a series generator having an armature winding, a series field winding, a commutating field winding having a magnetic circuit of a magnetic capacity sufficiently high so as not to become saturated by high currents traversing the commutating field winding thereby preventing a shifting of the current sheet by armature reaction, a series motor, of the same general design and capacity as the generator, connected in a loop circuit to the series generator to be electrically driven thereby; an adjustable resistor for controlling the excitation of the generator series field winding; a reactor having two coils one connected in series circuit relation with the series field winding and the other in series circuit with the adjustable resistor, said two series circuits being connected in parallel; and means for driving the series generator at substantially constant speed.

3. In a series drive, in combination, a series generator having an armature winding and a series field winding; a series motor having an armature winding and a series field winding connected in a loop circuit to said generator to be electrically driven thereby; an adjustable resistor for controlling the excitation of the generator series field winding; a reactor having two coils, one coil of said reactor being connected in series with the generator series field winding and the other coil being connected in series with the adjustable resistor, said series circuit including the one coil of the reactor and the adjustable resistor being connected in parallel to the series circuit including the generator series field and the other coil of the reactor; means for selectively interconnecting said reactor with either the generator series field winding or the motor field winding in the recited relation; and means for driving the generator at substantially constant speed.

4. In a series drive, in combination, a series generator having an armature winding and a series field winding; a series motor having an armature winding and a series field winding connected in a loop circuit to said generator to be electrically driven thereby; said generator having a commutating field winding having a magnetic circuit of a magnetic capacity sufficiently high so as not to become saturated by high currents traversing the commutating field winding thereby preventing a shifting of the current sheet by armature reaction; an adjustable resistor for controlling the excitation of the generator series field winding; a reactor having two coils one coil of said reactor being connected in series with the generator series field winding and the other coil being connected in series with the adjustable resistor, said series circuit including the one coil of the reactor and the adjustable resistor being connected in parallel to the series circuit including the generator series field and the other coil of the reactor; means for selectively interconnecting said reactor with either the generator series field winding or the motor field winding in the recited relation; and means for driving the generator at substantially constant speed.

WILLIAM R. HARDING.
SCOTT H. HANVILLE, Jr.